(No Model.) 2 Sheets—Sheet 1.
J. FISHER.
SIGNAL WIRE SUPPORT.
No. 511,132. Patented Dec. 19, 1893.
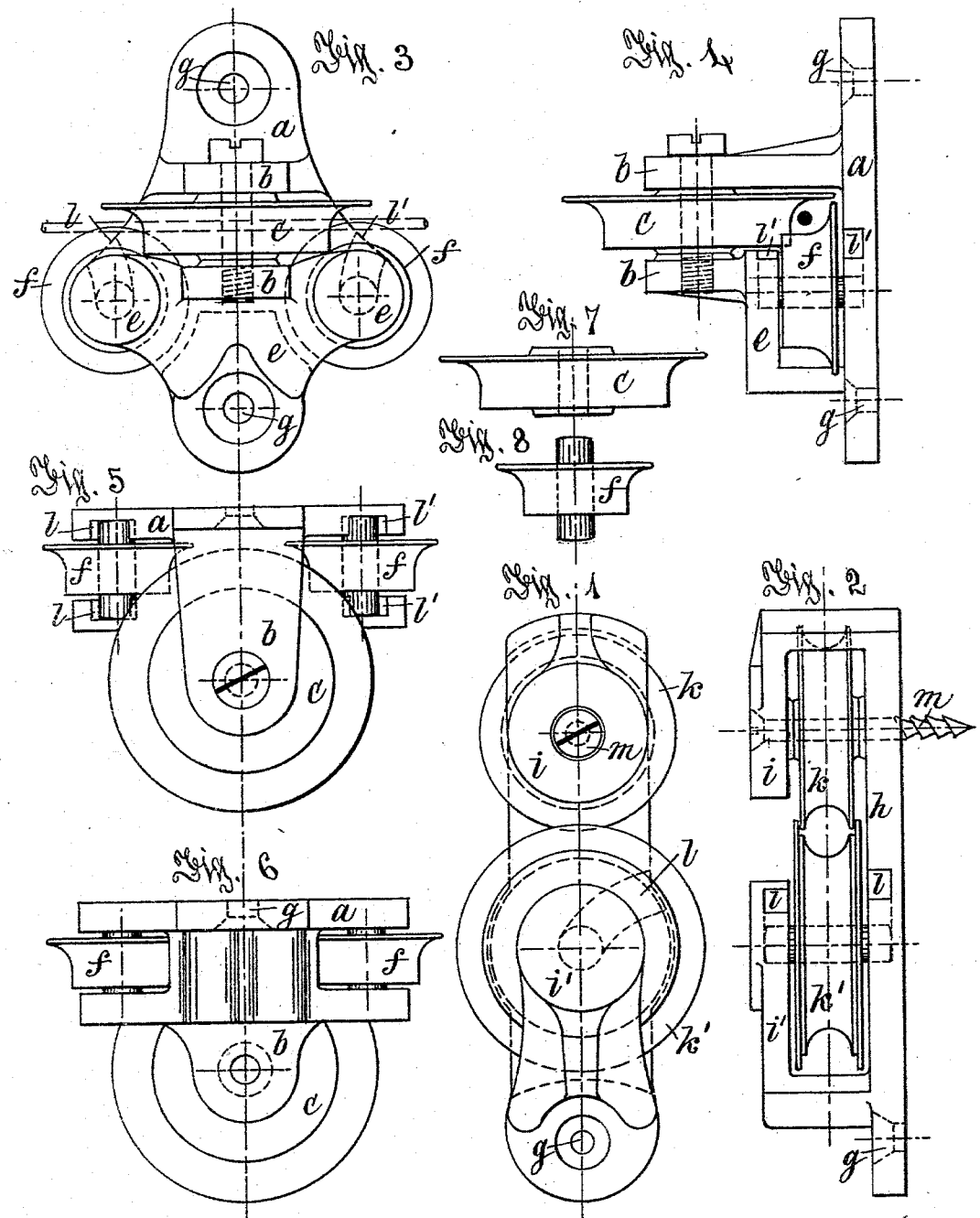
Witnesses:
Louis P. Keller
John C. Wilson
Inventor:
John Fisher,
by Whitman + Wilkinson,
Attys.

(No Model.) 2 Sheets—Sheet 2.

J. FISHER.
SIGNAL WIRE SUPPORT.

No. 511,132. Patented Dec. 19, 1893.

UNITED STATES PATENT OFFICE.

JOHN FISHER, OF MATLOCK, ENGLAND.

SIGNAL-WIRE SUPPORT.

SPECIFICATION forming part of Letters Patent No. 511,132, dated December 19, 1893.

Application filed February 28, 1893. Serial No. 464,131. (No model.)

*To all whom it may concern:*

Be it known that I, JOHN FISHER, gentleman, a subject of the Queen of Great Britain, residing at Matlock, in the county of Derby, England, have invented an improvement in apparatus for supporting and guiding the wires used for actuating distant signals upon railways and for other purposes of the like kind, of which the following is a specification.

My invention relates to the wires used for actuating distant signals and for other purposes of the like kind. Such wires are supported by guide or carrying rollers and the object of my improvement is to provide rollers which shall have as little friction as possible, and shall be cheap and easily adjusted and fixed, while allowing the wire when necessary to pass round ordinary curves. I attain this object by the devices illustrated in the accompanying drawings, in which—

Figure 9:
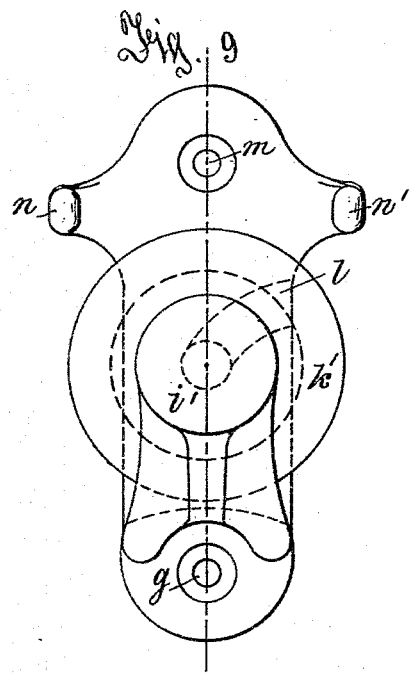

Figure 1 is a front view of a support or carrier for straight wires. Fig. 2 is a side view of the same. Fig. 3 is a front view of a support or guide for wires passing round angles or curves. Fig. 4 is a side view; Fig. 5 a top view, and Fig. 6 a view from below of the same. Figs. 7 and 8 are separate views of the guide pulleys $c$ and $f$ respectively. Fig. 9 is a front view and Fig. 10 a side view of a slight modification of Figs. 1 and 2.

Similar letters refer to similar parts in the different views.

In Figs. 1 and 2 the ordinary carrier consists of a grooved pulley $k'$ provided with a central stud or axis the ends of which fit in bearings on a bracket screwed to a post or other support by a screw at $g$. The bracket consists of a plate $h$ preferably of cast iron of sufficient thickness and having near one end a projection from which extends a short plate $i'$ parallel with the first one $h$. The pulley $k'$ revolves between these plates in which bearings are formed as follows:

Parallel diagonal slots $l, l$, are formed extending from the edges of both plates to the point where the axis of the pulley is to revolve. These slots do not pass completely through the plates, but are upon the insides only of the latter (as shown in Fig. 2) and they end in semi-circular notches which form bearings for the ends of the stud or axis of the pulley $k'$ to turn in, the ends of the latter being preferably very slightly convex and its length being such that it just fits freely in the two opposite notches. The pulley therefore while turning perfectly freely is prevented from touching the sides of the plates and there is consequently little or no friction while it can be readily removed and replaced. The main plate $h$ is provided at its end with a hole $g$ for a screw, and its other end has a similar projection and parallel plate $i$ between which a smaller grooved pulley $k$ is fitted and turns. I do not however use the diagonal end slots as described for the axis of the main pulley, but I make a central hole through the smaller pulley which turns upon a screw $m$ passed through the plates and screwed into the post or other support. The flanges of the smaller pulley $k$ enter freely between those of the larger one $k'$, and serve to retain the wire which is to be guided, securely but without friction in its place. Two or more separate pulleys may be used side by side where more than one wire is to be carried.

Figure 10:
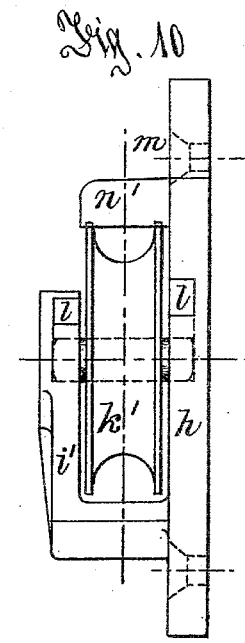

In the slightly modified form shown in Figs. 9 and 10, instead of the smaller pulley $k$ carried between the parallel plates $h$ and $i$, I only use two projecting pieces or guides $n, n'$, formed or fixed upon the upper end of the main back plate $h$ their lower edges being so arranged in a line with the upper edge of the groove in the pulley $k'$ and upon each side of it that the wire when introduced is not liable to move from its proper position, while it can readily be removed if desired by bending it slightly. The upper end of the carrier has a hole $m$ by which it is screwed to its support.

In a modified form of the carrier necessary or advisable where the wire has to pass round angles or curves (as illustrated in Figs. 3, 4, 5, and 6) I arrange two pulleys $f, f$, side by side in the lower part of the plate $a$, the studs or axles of these two pulleys turning in notches at the bottoms of diagonal slots $l\ l, l', l'$, passing partly through the thickness of the plates $a, e$, as already described. In addition I form in the upper part of the carrier two horizontal plates $b, b$, projecting from the back $a$ and front $e$, and between which a third horizontal pulley $c$ is fitted and turns upon a screw passing freely through it and screwed into the lower plate. The upper horizontal pulley c (shown separately in Fig. 7) has a flange only on its upper side and the two lower vertical pulleys f (shown in Fig. 8) only on their inner sides, the flange of the upper one c coming down sufficiently between those of the lower ones f, f. The wire passes (as shown in Fig. 4) over the upper edges of the two lower pulleys f, f, and behind the edge of the upper one c, and is kept securely in its place by their flanges.

By the different devices described the carriers described are very simple and free from friction.

What I claim, and desire to secure by Letters Patent of the United States, is—

The combination of the plates $h$, $i$ and $i'$, pulley and spindle $k'$, diagonal slots $l$, $l$, pulley $k$ and screw $m$ arranged and operating substantially as and for the purpose set forth and illustrated in Figs. 1 and 2.

In testimony whereof I have hereunto set my hand in the presence of two subscribing witnesses.

JOHN FISHER.

Witnesses:
EDMUND EDWARDS,
ARTHUR ERNEST EDWARDS.